United States Patent
Wu et al.

(10) Patent No.: US 6,441,875 B1
(45) Date of Patent: Aug. 27, 2002

(54) DEVICE FOR ENHANCING THE LINEAR POLARIZATION INTENSITY OF LIGHT WHICH PASSES THROUGH A POLARIZER

(75) Inventors: Jin-jei Wu, Taipei; Chen-lung Kuo, Tainan; Shu-hsia Chen, Hsinchu, all of (TW)

(73) Assignee: Chi Mei Optoelectronics Corporation, Tainan (TW)

( * ) Notice: Subject to any disclaimer, the term of this patent is extended or adjusted under 35 U.S.C. 154(b) by 0 days.

(21) Appl. No.: 09/414,535

(22) Filed: Oct. 8, 1999

(51) Int. Cl.[7] ..................... G02F 1/1333; G02F 1/1335
(52) U.S. Cl. ............................ 349/96; 349/86
(58) Field of Search ................. 349/175, 176, 349/96, 86, 98, 115; 359/497, 495

(56) References Cited

U.S. PATENT DOCUMENTS

| | | | | |
|---|---|---|---|---|
| 5,682,212 A | * | 10/1997 | Maurer et al. | 349/176 |
| 5,900,977 A | * | 5/1999 | Hikmet | 349/96 |
| 6,016,177 A | * | 1/2000 | Motomura et al. | 349/175 |
| 6,166,790 A | * | 12/2000 | Kameyama et al. | 349/175 |
| 6,252,640 B1 | * | 6/2001 | Kim et al. | 349/175 |

* cited by examiner

Primary Examiner—Toan Ton
(74) Attorney, Agent, or Firm—Bacon & Thomas

(57) ABSTRACT

A device for enhancing the linear polarization intensity of light which passes through a polarizer is provided, which comprises: a prepolarizer receiving incident natural light and splitting the natural light into a plurality of polarized light beams with different polarization directions, changing the polarization direction of the light beams, thereby enhancing the light intensity of a particular polarization direction; and a polarizer having polarization direction the same as that of the prepolarizer, receiving the light emitted from the prepolarizer, and then converting the light into a linearly polarized light.

4 Claims, 7 Drawing Sheets

DEVICE FOR ENHANCING THE LINEAR POLARIZATION INTENSITY OF LIGHT WHICH PASSES THROUGH A POLARIZER

BACKGROUND OF THE INVENTION a) Technical Field of the Invention

The present invention relates to a device for enhancing the linear polarization intensity of light which passes through a polarizer, which is used in liquid crystal display or polymer dispersed liquid crystal display employed in watch display or automatic display.

b) Description of the Prior Art

Conventionally, polarizers are substantially divided into three categories. The first category employs the principle of anisotropic absorption of light, for instance, polymer of anisotropic absorption of light being used to form a polarizer. The second category employs the principle of anisotropic refraction of light, for example, Wollaston prism. The third category employs the principle of anisotropic reflection of light, for example, Glan-Foucault prism. After the natural light enters these three kinds of polarizers, the intensity of the polarized light emitted from the polarizer is smaller than half of the intensity of the originally incident natural light.

In the structure of common liquid crystal display, the polarizer is an essential optical element. As a result of the application of the polarizer, the light source loses half of its energy. In order to improve the drawback, a polarizing beam splitter is used to split the natural light into two polarized light beams, i.e., right circularly polarized light and left circularly polarized light. Subsequently, polarization characteristics of the two polarized light beams are changed and then the two polarized light beams are combined again. In view of this, the efficiency of utilization of light source can be improved. However, the volume, weight and size of the liquid crystal display are increased. Therefore, the liquid crystal display has lost its advantages of thin in thickness, light in weight, and small in size. Accordingly, it is essential to solve the problem by enhancing the light transmissivity of the polarizer.

In addition, for instance, the polymer dispersed liquid crystal display, employs the effect of light scattering to improve viewing angle characteristics and enhance light transmissivity. If alignment treatment is performed on the polymer and liquid crystal of the polymer dispersed liquid crystal display, the scattering efficiency of the display can be improved. However, the scattering characteristics after alignment treatment are related to polarization direction of light. Therefore, for an incident natural light, one may hope to change the equally distributed polarization state into an anisotropically distributed polarization state such as to promote the diffraction efficiency for the aligned polymer dispersed liquid crystal.

SUMMARY OF THE INVENTION

Accordingly, an object of the present invention is to provide a device for enhancing the linear polarized light intensity which passes through a linear polarizer. The present invention employs a prepolarizer to receive the incident natural light. The incident natural light is converted into multiple beams having relatively significant polarization direction. The multiple beams then pass through a polarizer to obtain a linearly polarized light having high light transmissivity. In view of this, the liquid crystal display has the advantages of thin in thickness, light in weight and small in size.

Another object of the present invention is to provide a device for enhancing the linear polarized light intensity which passes through a linear polarizer, wherein the prepolarizer can change the polarization of the incident natural light under the condition that the intensity of the synthesized light is almost unaffected. Therefore, the prepolarizer can be mounted on the polymer dispersed liquid crystal display. In this way, not only the scattering efficiency of the liquid crystal display can be enhanced, but also the high brightness characteristic of the polymer dispersed liquid crystal display can be maintained.

One aspect of the present invention is to provide a device for enhancing the linear polarized light intensity which passes through a linear polarizer, which comprises: a prepolarizer receiving incident natural light and splitting the natural light into a plurality of polarized light beams with different polarization directions, changing the polarization direction of the light beams, thereby enhancing the total light intensity of a particular polarization direction; and a polarizer having polarization direction the same as that of the prepolarizer, receiving the light emitted from the prepolarizer and converting the emitted light into a linear polarized light.

The prepolarizer can be a layer composed of a cholesteric liquid crystal; and the layer is sandwiched between two transparent plates wherein finger print texture is formed, such that grating effect and optically active effect are generated for the incident natural light.

The prepolarizer can be a device that comprises: (1) a layer of prism set made of uniaxial briefringent material for splitting the incident natural light into two kinds of light beams, ordinary light and extra-ordinary light in different propagating direction. (2) film made of optically active material for changing the polarization direction of the two kinds of light beams, thereby enhancing the transmitted light intensity of a particular polarization direction.

Besides, the prepolarizer can be a transparent solid state polymer layer having optical activity, wherein finger print structure is formed. The transparent solid state polymer layer provides grating effect and optically active effect for the incident light.

Furthermore, the prepolarizer can be an UV-curable polymer dispersed liquid crystal layer having optical activity, wherein UV interference pattern is employed to project on the layer to form grating effect and optically active effect.

Another object of the present invention is to provide a device for enhancing the linear polarization intensity of light which passes through a polarizer, which comprises: (a) a plurality of superimposed prepolarizers, each having different period, which receive incident natural light and splitting the natural light into a plurality of polarized light beams with different polarization directions, changing the polarization direction of the light beams, thereby enhancing the light intensity of a particular polarization direction, eliminating the color effect caused by unequal birefringent and optical activity of incident light beams of different colors; and (b) a polarizer having polarization direction the same as that of the prepolarizer, receiving the light emitted from the prepolarizer, and then converting the emitted light into a linearly polarized light.

In addition, UV interference pattern can be employed to project on UV-curable polymer dispersed liquid crystal having optical activity multiple times to mitigate color effect.

DETAILED DESCRIPTION OF THE PREFERRED EMBODIMENT

Figure 1:
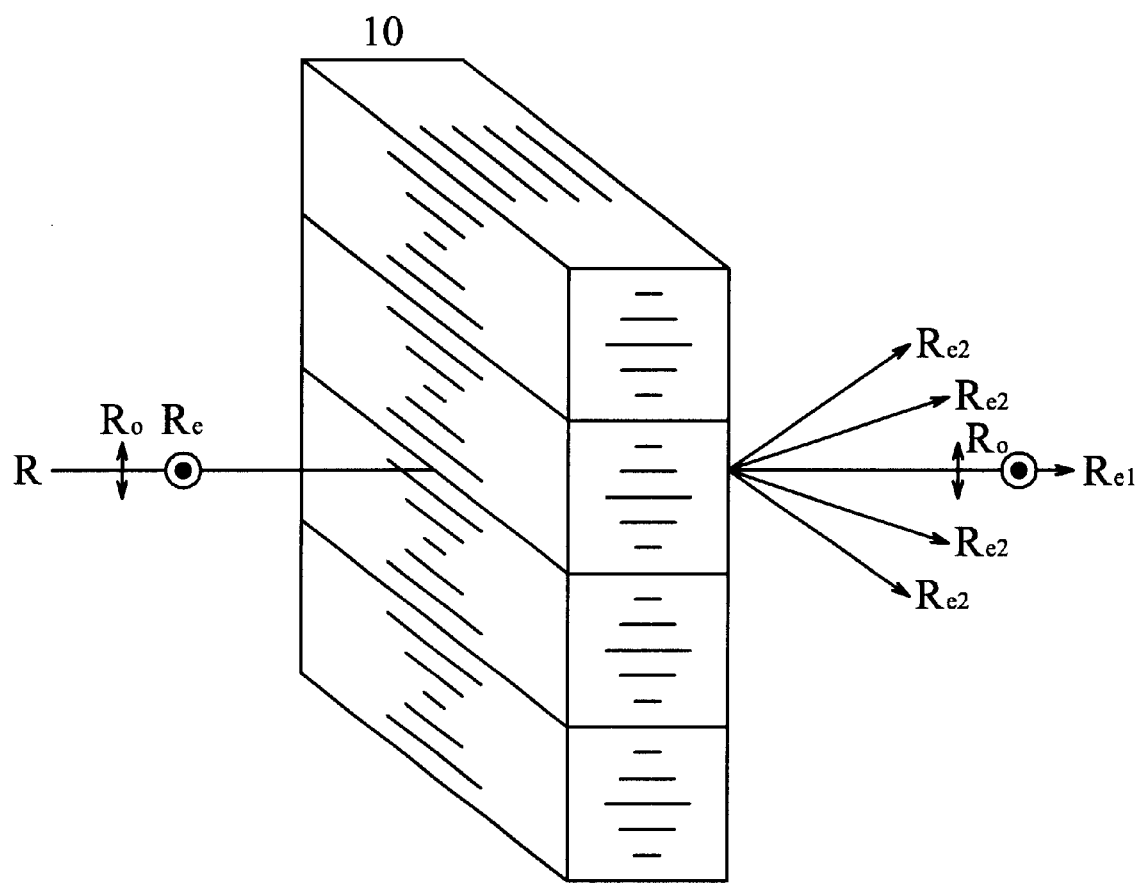
FIG. 1 illustrates a prepolarizer in accordance with the present invention, which is composed of cholesteric liquid crystal material.

FIG. 1 illustrates a prepolarizer in accordance with the present invention, which is composed of cholesteric liquid crystal material. In the figure, two transparent plates with the liquid crystal layer 10 sandwiched therebetween are not shown.

The incident natural light R consists of 50% ordinary light $R_o$. (the light component with polarization direction perpendicular to light axis) and 50% extra-ordinary light $R_e$ (the light component with polarization direction parallel to light axis). Since the polarization direction of ordinary light $R_o$ is perpendicular to the direction of liquid crystal molecule, ordinary light $R_o$ does not subject to variation of refraction index. Therefore, grating effect does not exist for ordinary light $R_o$, which leads to ordinary light $R_o$ passing through the liquid crystal layer with its polarization direction kept unchanged, as shown on the right side of FIG. 1, denoted as $R_o$.

On the other hand, for extra-ordinary light $R_e$, the polarization direction is not perpendicular to the direction of liquid crystal molecule, it thus subjects to variation of refraction index after it enters the liquid crystal layer 10. The refraction index varies as a function of position in the liquid crystal film. Therefore, grating effect happens to extra-ordinary light $R_e$, which leads to extra-ordinary light $R_e$ diffracting.

After the diffracted light passes through the cholesteric liquid crystal layer 10 having optical activity, it will be changed to elliptically polarized light having polarization component the same as that of ordinary light. In FIG. 1, $R_{e1}$ and $R_{e2}$ represent diffracted extra-ordinary light, wherein $R_{e1}$ and $R_{e2}$ denote zero and non-zero order extra-ordinary light, respectively.

In short, the linearly polarized light emitted from the cholesteric liquid crystal 10 may have intensity greater than 50% that of incident natural light R.

The cholesteric liquid crystal layer of FIG. 1, with fingerprint texture formed therein, can be manufactured as described in the following.

On a flat transparent glass substrate, an Indium Tin Oxide (ITO) layer is deposited to form a transparent electrode. Then, a polyvinyl alcohol (PVA) layer is coated on the electrode. Subsequently, cloth is used to rub the surface of the transparent electrode unidirectionally to perform alignment treatment. After that, two glass substrates with ITO layer and PVA layer formed thereon are arranged in a way such that the electrodes on the two glass substrates are disposed opposite to each other and the alignment directions therein are parallel to each other. The spacing between the two glass substrates is about 5~200 μm, a mixture of a cholesteric liquid crystal liquid CP (Merck Co.) and nematic liquid crystal E7 (Merck Co) is sealed therein under room temperature, wherein the weight of CP is about 0.5–5%. Next, an AC voltage is applied thereon, it can be observed that the liquid crystal layer shows a fingerprint texture while the applied voltage is about 5~40V. The following gives two observation methods: (1) the alternating brightness-darkness pattern can be seen by using a polarizing microscope; (2) multi-order diffracted light point can be obtained by applying laser light on the sample and then projecting it onto the screen.

Figure 2:
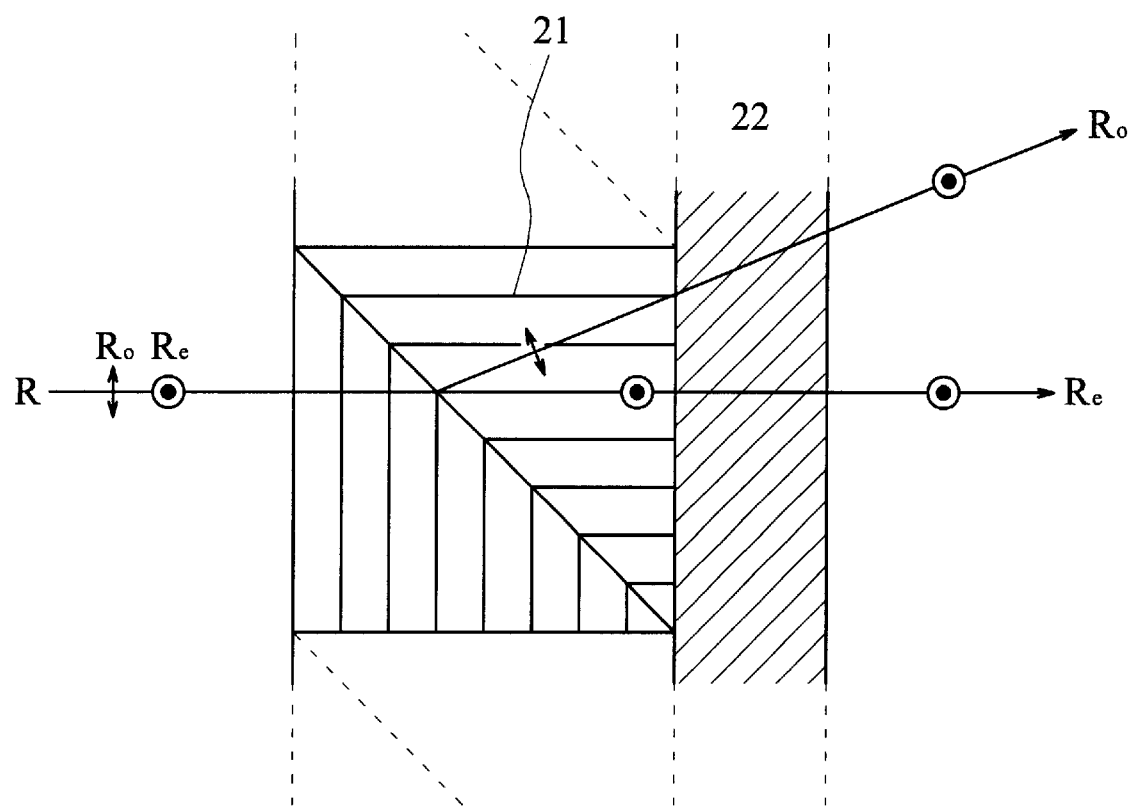
FIG. 2 illustrates a prepolarizer in accordance with the present invention, which consists of two portions: (1) a prism made of uniaxial briefringent material; (2) a thin plate made of optically active material.

FIG. 2 illustrates a prepolarizer in accordance with the present invention, which consists of two portions: (1) a layer of prism set made of uniaxial briefringent material; (2) a thin plate made of optically active material, wherein the same numerals denote the same meanings as in FIG. 1. As shown in FIG. 2, the prepolarizer in accordance with the present invention comprises: a layer of prism set 21 made of a plurality of uniaxial birefringent material; and a thin plate 22 made of optically active material. The prism 21 splits the incident natural light into ordinary light $R_o$ and extra-ordinary light $R_e$, which have different propagating directions. The thin plate 22 changes the polarization direction of the two light beams $R_o$, $R_e$. As propagating paths in the thin plate 22 of the two light beams $R_o$, $R_e$ are different, the polarized rotational angles of the two polarized beams are different. Therefore, the light intensity of a particular polarization direction can be enhanced.

Figure 3:
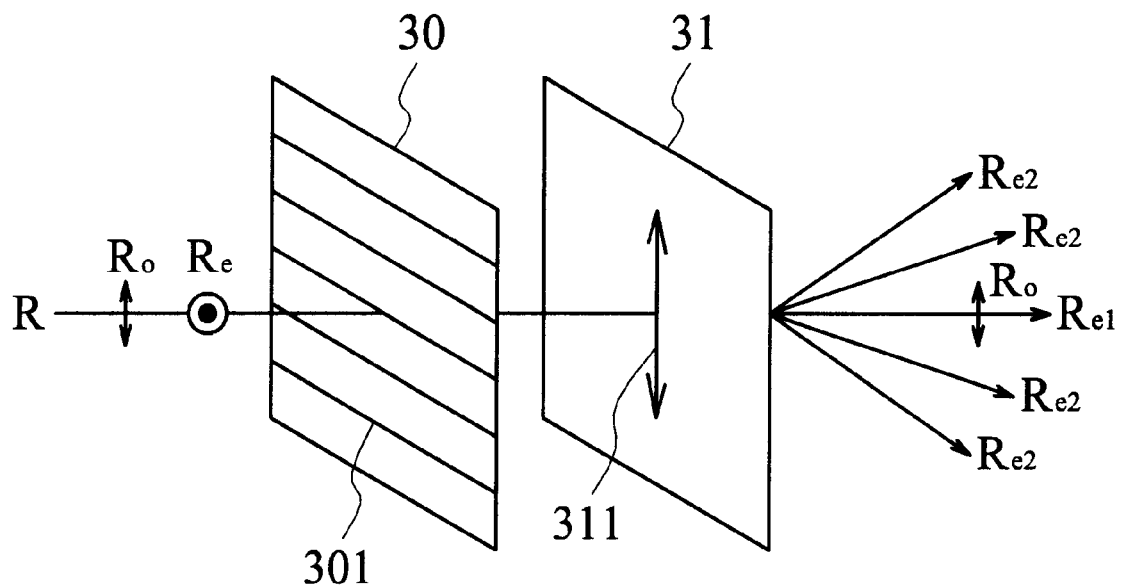
FIG. 3 illustrates the device in accordance with the present invention, including a prepolarizer and a polarizer.

FIG. 3 illustrates the device in accordance with the present invention, including a prepolarizer 30 and a linear polarizer 31, wherein 301 denotes grating pattern of the prepolarizer 30; 311 denotes the direction of transmission axis of linear polarizer 31. $R_o$, $R_{e1}$, and $R_{e2}$ have been defined earlier and further explanations are omitted.

Figure 4:
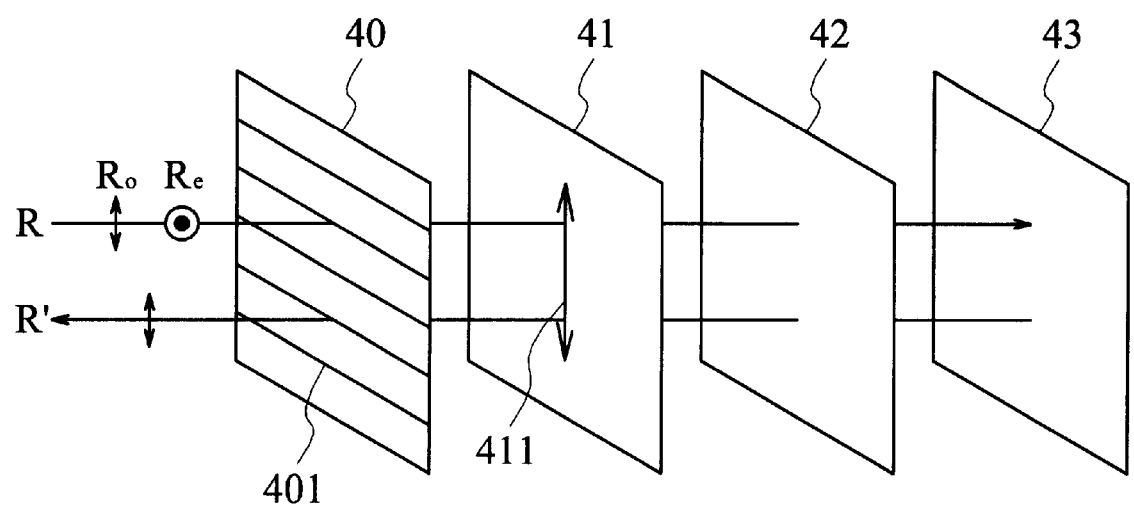
FIG. 4 illustrates one kind of reflection type liquid crystal display which uses the device in accordance with the present invention.

FIG. 4 illustrates one kind of reflection type liquid crystal display which uses the device in accordance with the present invention. The reflection type liquid crystal display comprises a prepolarizer 40, a linear polarizer 41, a twisted nematic LCD 42 and a reflective diffuser 43, wherein 401 denotes grating pattern of the prepolarizer 40; 411 denotes the direction of transmission axis of the polarizer 41; R' denotes the emitted polarized light.

Figure 5:
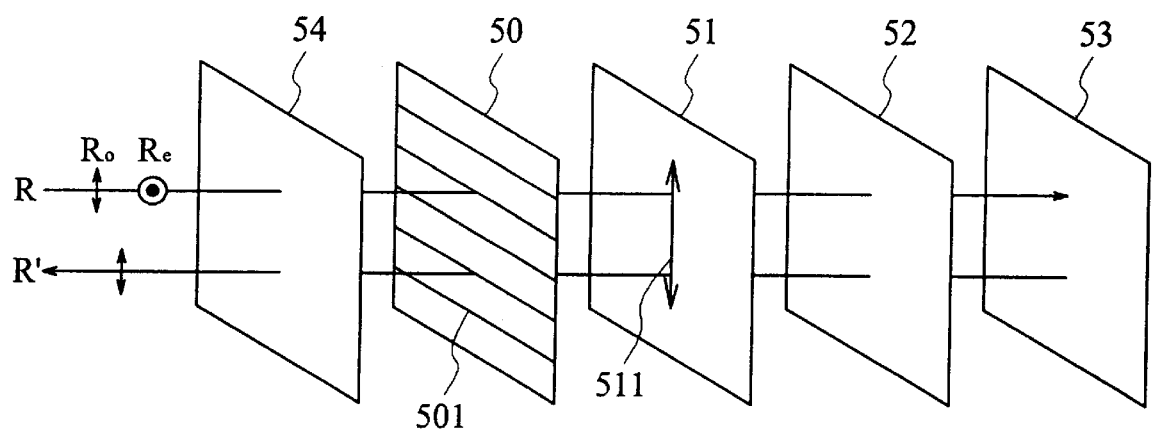
FIG. 5 illustrates another kind of reflection type liquid crystal display which uses the device in accordance with the present invention.

FIG. 5 illustrates another kind of reflection type liquid crystal display which uses the device in accordance with the present invention. The reflection type liquid crystal display comprises a prepolarizer 50, a linear polarizer 51, a twisted nematic LCD 52, a reflective mirror 53, and a transmission type diffuser 54, wherein 501 denotes grating pattern of the prepolarizer 50; 511 denotes the direction of transmission axis of the polarizer 51.

Figure 6:
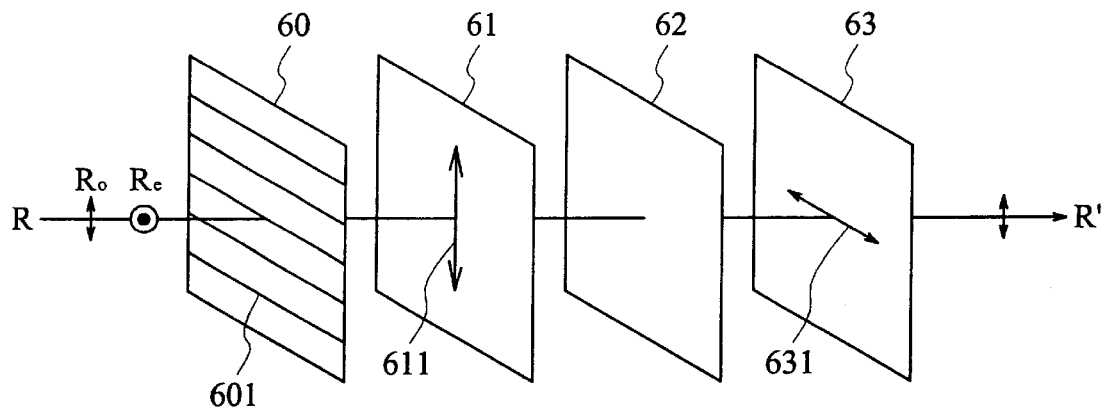
FIG. 6 illustrates a transmission type liquid crystal display which uses the device in accordance with the present invention.

FIG. 6 illustrates a transmission type liquid crystal display which uses the device in accordance with the present invention. The transmission type liquid crystal display comprises a prepolarizer 60, a linear polarizer 61, a twisted nematic LCD 62 and a polarizer 63, wherein 601 denotes grating pattern of the prepolarizer 60; 611 and 631 denote respectively the direction of transmission axes of the polarizers 61 and 63.

Figure 7:
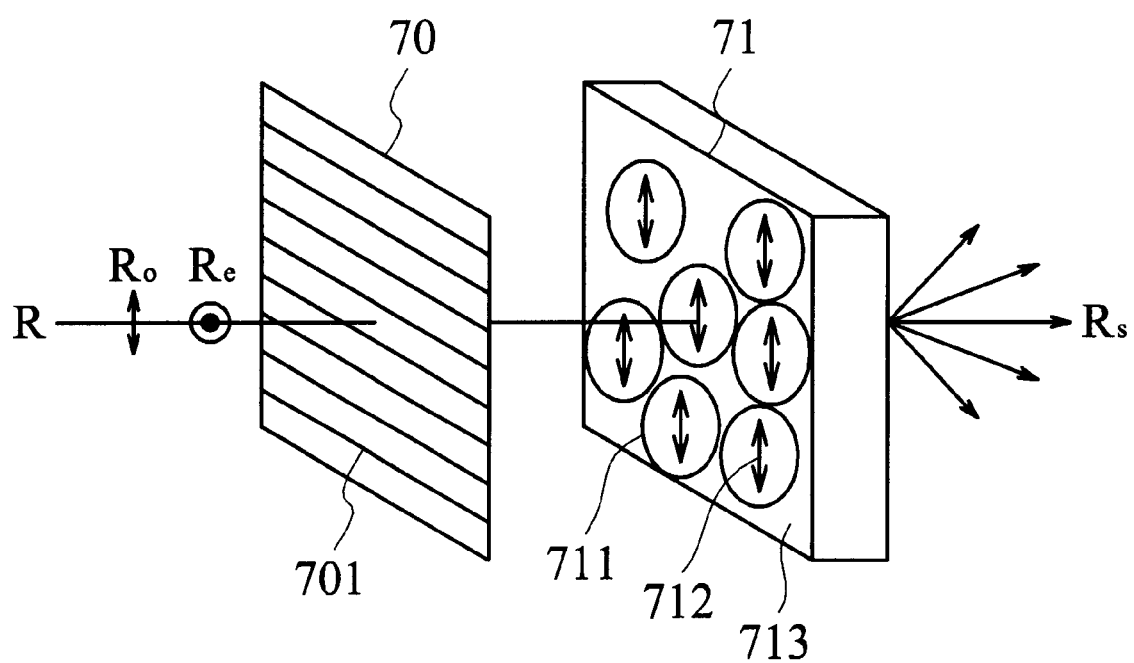
FIG. 7 illustrates an aligned polymer dispersed liquid crystal display which uses the device in accordance with the present invention.

FIG. 7 illustrates an aligned polymer dispersed liquid crystal display which uses the device in accordance with the present invention. The aligned polymer dispersed liquid crystal display comprises a prepolarizer 70 and an aligned polymer dispersed liquid crystal layer 71, wherein 701 denotes grating pattern of the prepolarizer 70; 711 denotes liquid crystal domain; 712 denotes alignment direction of nematic liquid crystal molecule within the liquid crystal domain 711; 713 denotes polymer; $R_s$ denotes the emitted scattering light.

While specific embodiments of the invention have been shown and described in detail to illustrate the application of the principles of the invention, it will be understood that the invention may be embodied otherwise without departing from such principles.

What is claimed is:

1. A device for enhancing the linear polarization light intensity which passes through a polarizer comprising:
    a) a prepolarizer for receiving incident natural light without reflecting it, and splitting the natural light into a plurality of polarized light beams with different polarization directions, changing the polarization direction of the light beams, thereby enhancing the light intensity of a particular polarization direction; and
    b) a polarizer for receiving the light beams split by said prepolarizer, and converting the light beams into a linearly polarized light; wherein the prepolarizer is composed of a cholesteric liquid crystal material sandwiched between two transparent plates and formed with fingerprint texture, such that grating effect and optically active effect are generated for the incident natural light.

2. A device as set forth in claim 1, wherein the prepolarizer comprises:
    a) a layer of prism set made of uniaxial briefringent material for splitting the incident natural light into ordinary light and extra-ordinary light, which have different propagating directions; and
    b) a film made of optically active material for changing the polarization direction of the two light beams, thereby enhancing the light intensity of a particular polarization direction.

3. A device as set forth in claim 1, wherein the prepolarizer is a solid state polymer layer which is transparent and optically active.

4. A device as set forth in claim 1, wherein the prepolarizer is an UV-curable polymer dispersed liquid crystal layer having optical activity, wherein UV interference pattern is employed to project on the layer to form grating effect and optically active effect.

* * * * *